United States Patent Office 3,281,380
Patented Oct. 25, 1966

3,281,380
PROCESS OF PROMOTING LOW HYSTERESIS OF RUBBER USING 3,3'-p-PHENYLENEBIS(IMINO-METHYLENE)BIS(2-THIAZOLINETHIONES)
Lloyd A. Walker, Akron, Ohio, assignor to Monsanto Company, St. Louis, Mo., a corporation of Delaware
No Drawing. Filed Feb. 17, 1965, Ser. No. 433,467
10 Claims. (Cl. 260—5)

This application is a continuation-in-part of the abandoned application Serial No. 43,991, filed July 20, 1960.

The present invention relates to a process of improving the properties of rubber compositions and more particularly to improving the properties of rubber mixes containing a relatively high proportion of reinforcing pigment.

The so-called "low-hysteresis" processing of carbon-black rubber mixes by masticating the mixes at high temperatures for extended periods of time has long been known. Improvements have been made from time to time by discovery of chemical adjuvants which permit shorter mixing times. Heretofore, these techniques required special processing at elevated temperatures after which the vulcanizing ingredients were added in the usual manner. Significantly, the need for special processing has been eliminated by the present invention. The action of catalysts for low-hysteresis processing has been explained on the basis of promoting reaction between rubber and carbon black. While the improved adjuvants provided by the present invention are presumed to function by similar mechanisms and are therefore described as promoters, this is not really known. The invention is not limited to any theory of the mechanism by which the new compounds impart the desirable properties hereinafter described in detail.

An object of the invention is to provide new chemicals which promote the low-hysteresis rubber vulcanizates and to provide new accelerators of vulcanization. A particular object is to provide promoting agents effective at low temperatures. A general object of the invention is to improve the properties of natural and synthetic rubbers by means of special treating agents. Another object is to provide agents which increase the modulus, lower the torsional hysteresis, and decrease the internal friction of rubber vulcanizates. A specific object is to promote reaction between rubber and carbon black or other reinforcing pigment by organic chemical catalysts. A further specific object is to improve dispersion of carbon black and other fillers in rubber.

Improved vulcanizates are obtained according to the present invention by incorporating into the rubber mixture a small amount of 3,3'-[p-phenylenebis(iminomethylene)]bis(2-thiazolinethione). Amounts of 0.1–5% of the rubber hydrocarbon comprise the practical useful range under most conditions. These are not the absolute limits and measurable effects are obtained with even smaller amounts. Similarly, larger amounts can be used but usually without advantage. The preferred range is 0.25–1.0%. Vulcanizing and other ingredients as desired are added, preferably after mixing rubber, reinforcing pigment, and promoter. Delayed action accelerators of the thiazolesulfenamide type are preferably added, but the invention is not limited to any particular vulcanizing system. The 3,3'-[p-phenylenebis(iminomethylene)]bis(2 - thiazolinethiones) have definite accelerating action and permit reduction of amount of other accelerating ingredients or even elimination of other accelerating ingredients. Addition of the new adjuvants to vulcanizable rubber formulations increases modulus of the vulcanizates. At the same time, such vulcanizates retain reasonable elongation. It will be appreciated that useful results flow from incorporating the promotors in gum stocks as accelerators of vulcanization, but the invention is of greater practical importance for the compounding of pigmented stocks.

Any of the rubber reinforcing pigments may be used in the practice of the present invention. These include reinforcing silica, but reinforcing carbon blacks are preferred. The black may be either furnace black or channel black. The amount of black is desirably at least 25 parts by weight per 100 parts by weight of rubber and usually 40–50 parts by weight in the case of tread stocks. Carbon black is normally added first in the mixing cycle, and in the usual practice of the invention the promoter is added concomitantly with it. On the other hand, the promoter may be premixed with the carbon black and the mixture added to rubber. Alternatively, rubber and promoter are admixed followed by the carbon black and other ingredients as desired. Banbury mixing is advantageous because it exerts severe masticating action and achieves uniform dispersion of the ingredients within short mixing times. The dispersing action of the new compounds is pronounced.

The adjuvants used in the practice of the invention may be represented by the general formula

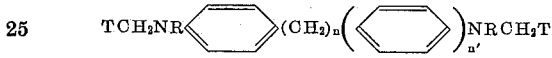

where $n$ and $n'$ are zero or one with the proviso that when $n'$ is zero $n$ is also zero, T represents a 2-thioxo-3-thiazolinyl or 2-thioxo-3-oxazolinyl radical, and R represents hydrogen or a lower alkyl radical. As typical examples of T may be mentioned 2-thioxo-3-benzothiazolinyl,
4-phenyl-2-thioxo-3-benzothiazolinyl,
2-thioxo-3-benzoxazolinyl,
4-methyl-2-thioxo-3-benzothiazolinyl,
4-ethyl-2-thioxo-3-benzothiazolinyl,
5-chloro-2-thioxo-3-benzothiazolinyl,
6-ethoxy-2-thioxo-3-benzothiazolinyl,
nitro-2-thioxo-3-benzothiazolinyl,
4-methyl-2-thioxo-3-thiazolinyl,
4,5-dimethyl-2-thioxo-3-thiazolinyl,
5-carbo-loweralkoxy-4-loweralkyl-2-thioxo-3-thiazolinyl, and
dimethyl-2-thioxo-3-benzothiazolinyl.

Examples of R comprise methyl, ethyl, propyl, isopropyl, butyl, and amyl.

There is some question as to whether the methylene radical is linked to nitrogen in the azole ring or to sulfur outside the ring. For example, N,N'-bis(2-benzothiazolylthiomethyl)-p-phenylenediamine may be presented as

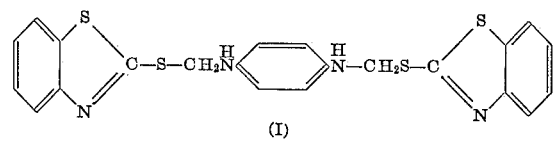
(I)

or as 3,3'-[p-phenylenebis(iminomethylene)]bis(2-benzothiazolinethione)

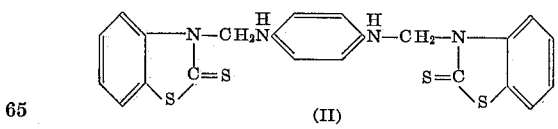
(II)

The invention is not limited to any theory of the precise configuration of the new promoters. These compounds result from condensation of mercaptothiazoles, formaldehyde, and the phenylenediamines; and it will be understood that the products hereinafter named refer to this class. However, determination of the infrared spectrum of the compound believed to have Structure I or II above showed that Structure II was correct. An infrared spectrum was determined in Nujol mull and in halocarbon mull. The ultraviolet spectrum confirmed the correctness of Structure II. The conclusions were, in part, based on comparison to the spectra of authentic samples of 2-methylthiobenzothiazole and 3-methyl-2-benzothiazolinethione.

Typical examples of the compounds are the following:

3,3'-[p-phenylenebis(iminomethylene)]bis(4-carboethoxy-2-thiazolinethione),
3,3'-[p-phenylenebis(iminomethylene)]bis(5-carboethoxy-4-methyl-2-thiazolinethione),
3,3'-[p-phenylenebis(iminomethylene)]bis(2-benzothiazolinethione),
3,3'-[p-phenylenebis(iminomethylene)]bis(4-ethyl-2-benzothiazolinethione),
3,3'-[p-phenylenebis(iminomethylene)]bis(7-methyl-2-benzothiazolinethione),
3,3'-[p-phenylenebis(iminomethylene)]bis(4-methyl-2-benzothiazolinethione),
3,3'-[p-phenylenebis(iminomethylene)]bis(5-methyl-2-benzothiazolinethione),
3,3'-[p-phenylenebis(iminomethylene)]bis(6-methyl-2-benzothiazolinethione),
3,3'-[p-phenylenebis(iminomethylene)]bis(4-methyl-5-chloro-2-benzothiazolinethione),
3,3'-[p-phenylenebis(iminomethylene)]bis(4-chloro-2-benzothiazolinethione),
3,3'-[p-phenylenebis(iminomethylene)]bis(5-chloro-2-benzothiazolinethione),
3,3'-[p-phenylenebis(iminomethylene)]bis(6-chloro-2-benzothiazolinethione),
3,3'-[p-phenylenebis(iminomethylene)]bis(6-phenyl-2-benzothiazolinethione),
3,3'-[p-phenylenebis(iminomethylene)]bis(4-phenyl-2-benzothiazolinethione),
3,3'-[p-phenylenebis(iminomethylene)]bis(4,5-dimethyl-2-benzothiazolinethione),
3,3'-[p-phenylenebis(iminomethylene)]bis(4,6-dimethyl-2-benzothiazolinethione),
3,3'-[p-phenylenebis(iminomethylene)]bis(4-methoxy-2-benzothiazolinethione),
3,3'-[p-phenylenebis(iminomethylene)]bis(5-methoxy-2-benzothiazolinethione),
3,3'-[p-phenylenebis(iminomethylene)]bis(6-methoxy-2-benzothiazolinethione),
3,3'-[p-phenylenebis(iminomethylene)]bis(4-methoxy-6-chloro-2-benzothiazolinethione),
3,3'-[p-phenylenebis(iminomethylene)]bis(4-ethoxy-2-benzothiazolinethione),
3,3'-[-phenylenebis(iminomethylene)]bis(5-ethoxy-2-benzothiazolinethione),
3,3'-[p-phenylenebis(iminomethylene)]bis(4,6-dimethyl-7-chloro-2-benzothiazolinethione,
3,3'-[p-phenylenebis(iminomethylene)]bis(4,6-dimethyl-5,7-dichloro-2-benzothiazolinethione),
3,3'-[p-phenylenebis(iminomethylene)]bis(4-methyl-2-thiazolinethione),
3,3'-[p-phenylenebis(iminomethylene)]bis(4,5-dimethyl-2-thiazolinethione), and
3,3'-[4,4'-methylenebis(phenyleneiminomethylene)]bis(2-benzothiazolinethione).

As illustrative of the preparation of compounds useful for improving properties of rubber, a mixture of 50 grams (0.284 mole) of 2-mercaptobenzothiazole, 300 ml. alcohol, and 15.5 grams (0.147 mole) of p-phenylenediamine was stirred at room temperature for 30 minutes after which time 26 grams (0.29 mole) of 37% formaldehyde was added in one portion. Stirring was continued for one hour at which time the temperature had risen to 32° C. The mixture was heated to refluxing temperature and stirred and heated at refluxing temperature for 2 hours, cooled to 10° C. and solid removed by filtration, washed with ethyl alcohol, and dried. There was obtained 68 grams (100% yield) of 3,3'-[p-phenylenebis(iminomethylene)]bis(2 - benzothiazolinethione), M.P. 197°–198.5° C.

Substitution of mercaptobenzoxazole for mercaptobenzothiazole in the same molecular proportions in the foregoing procedure resulted in the formation of 3,3'-[p-phenylenebis(iminomethylene)]bis(2 - benzoxazolinethione), a tan solid, M.P. 182°–183° C. Replacing mercaptobenzothiazole with an equal molecular proportion of 6-ethoxymercaptobenzothiazole resulted in the formation of 3,3' - [p - phenylenebis(iminomethylene)]bis(6-ethoxy-2-benzothiazolinethione), a tan solid, M.P. 151°–152° C. Replacing mercaptobenzothiazole by 5-chloromercaptobenzothiazole resulted in the formation of 3,3' - [p - phenylenebis(iminomethylene)]bis(5 - chloro-2-benzothiazolinethione), a yellowish tan solid, M.P. 159°–162° C.

A mixture of 34 grams (0.2 mole) of 2-mercaptobenzothiazole, 400 ml. ethyl alcohol, and 13 grams (0.1 mole) of N,N'-dimethyl-p-phenylenediamine was stirred at 25°–27° C. for a period of 30 minutes, after which time 18 grams (0.22 mole) of 37% formaldehyde solution was added in one portion. The resulting mixture was stirred for 30 minutes during which time the temperature increased 2° C. and then stirred at reflux temperature for 2 hours. The hot mixture was then filtered to remove 19 grams of a light green solid, M.P. 162°–168° C. The filtrate was then cooled and diluted with 500 ml. of ice water to yield 23.5 grams of light green solid, M.P. 168°–172° C. Recrystallization of both fractions from chloroform gave an 86.2% yield of 3,3'-{p-phenylenebis[(methylimino)methylene]}bis(2-benzothiazolinethione) as a bright yellow solid, M.P. 174°–176° C. Other examples were prepared by similar techniques. The reactions may even be effected in the rubber matrix although less efficiently by adding the mercaptothiazole, amine, and formaldehyde or paraformaldehyde. Nevertheless, useful results were obtained by this technique.

As illustrative of the desirable properties imparted to rubber compositions by the new adjuvants, examples thereof were added along with carbon black and styrene-butadiene copolymer rubber to a Banbury mixer. SBR–1502 rubber, 1400 parts by weight, was charged to the Banbury mixer and mixed for 3 minutes at 25° C. The test material was then added to a portion, 400 parts by weight, of the rubber from the Banbury mixer. The addition was made on the differential rolls of a rubber mill at 50° C. The stock was milled for about 5 minutes and cut several times from side to side to obtain adequate dispersion. The milled portion containing the test material was then added to the remainder of the stock in the Banbury together with carbon black. The Banbury mixer was heated to 100° C. before making these additions. Banbury mixing was continued for a total of 6 minutes at 100° C. and the stocks then dumped and passed six times through a rubber mill at 50° C. Vulcanizable stocks were compounded on the mill at 50° C. by adding stearic acid, zinc oxide, saturated hydrocarbon softener, sulfur, and N-cyclohexyl-2-benzothiazolesulfenamide. These were then compared to a similarly prepared stock without the chemical additive. The complete formulations were as follows:

| Stock | Parts by Weight | |
| --- | --- | --- |
| | A | B |
| SBR 1502 | 100 | 100 |
| Chemical additive | | 0.5 |
| Carbon black (high abrasion furnace) | 50 | 50 |
| Zinc oxide | 4 | 4 |
| Stearic acid | 2 | 2 |
| Saturated hydrocarbon softener | 10 | 10 |
| N-Cyclohexyl-2-benzothiazolesulfenamide | 1.2 | 1.2 |
| Sulfur | 1.75 | 1.75 |

The stocks were cured in the usual manner by heating in a press 60 minutes at 144° C. The modulus of elasticity at 300% elongation at the optimum cures was determined in the usual manner. Torsional hysteresis was determined at room temperature with an apparatus which embodied a torsional pendulum. In this apparatus the sample of rubber tested supplied the force to restore the pendulum when it was deflected. This supplied a measure of the energy not returned on torsional deformation. The logarithmic decrement of the observed amplitude was recorded. Heat rise from the base temperature after flexing in a Goodrich flexometer at 100° C. was also determined. Typical results are recorded below:

| Chemical Additive | 300% Modulus | Torsional Hysteresis | Heat Rise, ° C. |
|---|---|---|---|
| None | 2,320 | 0.209 | 31 |
| 3,3'-[p-Phenylenebis(iminomethylene)]bis(2-benzothiazolinethione) | 2,820 | 0.175 | 20 |
| 3,3'-[4,4'-Biphenylylenebis-(iminomethylene)]bis(2-benzothiazolinethione) | 2,320 | 0.185 | 25 |

Similar improvements were observed when the chemical was mixed with SBR rubber at 100° C. before carbon black was added. The procedure was the same through addition of chemical to the hot Banbury but no carbon black was added at this point. Banbury mixing at 100° C. was continued 3¼ minutes, then one-half the carbon black was added along with the softener and mixed for one minute. The remainder of the carbon black was then added and mixing continued for three minutes after which the stocks were dumped, milled at 50° C., and other ingredients added all as described previously. As compared to the control Stock A, there was a 27% increase in 300% modulus, only 8% reduction in ultimate elongation, 26% decrease in torsional hysteresis, and 9° reduction in heat rise.

As further examples of the invention, tests were carried out by the first of the above-described procedures, and the changes from the untreated or control Stock A calculated. In the results recorded below "+" indicated percent increase as compared to the control and "—" indicates percent decrease. In case of the heat rise data, the figures recorded are change in °C. from the control instead of percent.

| Chemical Additive | 300% Modulus, Percent Change | Elongation, Percent Change | Torsional Hysteresis, Percent Change | Heat Rise, ° C. Change from Control |
|---|---|---|---|---|
| 3,3'-[p-Phenylenebis-(iminomethylene)]-bis(2-benzoxazolinethione) | +26.7 | −6 | −13.3 | −2 |
| 3,3'-{p-Phenylenebis-[(methylimino)methylene]}bis(2-benzothiazolinethione) | +25 | −10 | −24.5 | −8 |
| 3,3'-[p-Phenylenebis-(iminomethylene)]bis-(5-chloro-2-benzothiazolinethione) | +29.8 | −16.7 | −18.6 | −8 |
| 3,3'-[p-Phenylenebis-(iminomethylene)]bis-(6-ethoxy-2-benzothiazolinethione) | +31.3 | −18.5 | −16.1 | −7 |

That the results are relatively independent of temperature was demonstrated by varying the temperature of the Banbury mixing. The initial temperature, i.e. the temperature at which the Banbury was pre-heated before adding the carbon black and the milled portion containing the chemical in the foregoing procedure, was varied as indicated below. The procedure was otherwise the same. Torsional hysteresis and heat rise of Stocks A and B were then compared. The chemical additive in Stock B was the same as before.

| Banbury Temperature, ° C. | Stock | Torsional Hysteresis | Heat Rise, ° C. |
|---|---|---|---|
| 25 | A | .236 | 20 |
| 25 | B | .193 | 15 |
| 50 | A | .242 | 31 |
| 50 | B | .193 | 23 |
| 75 | A | .232 | 18 |
| 75 | B | .178 | 13 |

As illustrative of use in natural rubber, 1400 parts by weight of smoked sheet rubber was added to a Banbury mixer and mixed for 5 minutes at 25° C. The chemical to be tested was added to a 400 parts-by-weight portion of the rubber from the first step on a rubber mill at 70° C. The mixture was milled for 5 minutes, cutting several times from each side to obtain adequate dispersion. The rubber containing the test ingredient and carbon black were then added to the remainder of the stock in the Banbury after pre-heating the Banbury mixer to 100° C. Mixing was continued for 6 minutes and the stock dumped and passed six times through a rubber mill at 70° C. The remaining ingredients were added on the mill at 70° C. Final compositions were as follows:

| Stock | Parts by Weight | |
|---|---|---|
| | C | D |
| Smoked sheet rubber | 100 | 100 |
| Chemical additive | | 0.5 |
| Zinc oxide | 5.0 | 5.0 |
| Stearic acid | 3.0 | 3.0 |
| Saturated hydrocarbon softener | 3.0 | 3.0 |
| N-Cyclohexyl-2-benzothiazolesulfenamide | 0.5 | 0.5 |
| Sulfur | 2.5 | 2.5 |

The stocks were cured by heating in a press for 60 minutes at 144° C. and properties compared as hereinabove described.

| Chemical Additive | 300% Modulus, Percent Change | Elongation, Percent Change | Torsional Hysteresis, Percent Change | Heat Rise, ° C. Change from Control |
|---|---|---|---|---|
| 3,3'-[p-Phenylenebis-(iminomethylene)]bis-(2-benzothiazolinethione) | +25.2 | −13 | −11.8 | −7 |
| 3,3'-[p-Phenylenebis-(iminomethylene)]bis-(2-benzoxazolinethione) | +9.3 | −6.3 | −9.6 | −1 |

Results were similar when the carbon black was omitted in the addition to the Banbury at 100° C. Mixing was continued for 3¼ minutes, then one-half of the carbon black was added along with the softener, and mixed for one minute. The remainder of the carbon black was then added and mixing continued for three minutes after which the stocks were dumped, milled at 50° C., and other ingredients added all as previously described.

The new adjuvants are especially useful for compounding blends of natural rubber and SBR copolymer rubber. Due to the poorer hysteresis properties of the synthetic as compared to the natural product, it is not feasible to make thick articles subject to severe stress, as for example large truck tires, from synthetic rubber. Excessive heat accumulates during use causing early failure. However, for reasons of economy it is common to admix natural rubber with the synthetic product, but the amount of synthetic which can be used depends upon the hysteresis properties of the mixture. The practice of the present invention permits the use of higher amounts of synthetic than would otherwise be feasible. As illustrative of the advantages obtained from blends of rubbers, a mixture of 70 parts natural rubber and 30 parts styrene-butadiene copolymer rubber was employed in compounding stocks with the chemical adjuvants of this invention. The mixing procedure was the same as that described for natural rubber when the carbon black and promoter were added together. The composition of the vulcanizable stocks finally prepared was as follows:

| Stock | Parts by Weight | |
| --- | --- | --- |
| | E | F |
| Natural rubber—SBR (70/30) | 100 | 100 |
| Chemical additive | | 0.5 |
| Zinc oxide | 4.7 | 4.7 |
| Stearic acid | 2.7 | 2.7 |
| Saturated hydrocarbon softener | 5.0 | 5.0 |
| N-Cyclohexyl-2-benzothiazolesulfenamide | 0.71 | 0.71 |
| Sulfur | 2.18 | 2.18 |

Stocks were cured by heating in a press at 144° C. and properties evaluated as hereinabove described.

| Chemical Additive | 300% Modulus, Percent Change | Elongation, Percent Change | Torsional Hysteresis, Percent Change | Heat Rise, ° C. Change from Control |
| --- | --- | --- | --- | --- |
| 3,3'-[p-Phenylenebis-(iminomethylene)]bis-(2-benzothiazolinethione) | +21.8 | −16 | −9.3 | −2 |

As indicated above the promoters of this invention exert some accelerating activity; and, if desired, the usual accelerating component can be eliminated but significantly higher amounts of the new compounds are usually required as compared to most commercial accelerators. As illustrative of this aspect of the invention, stocks were compounded comprising:

| Stock | Parts by Weight | |
| --- | --- | --- |
| | G | H |
| SBR 1501 | 100 | 100 |
| Furnace carbon black | 50 | 50 |
| Zinc oxide | 4 | 4 |
| Stearic acid | 2 | 2 |
| Sulfur | 1.75 | 1.75 |
| Saturated hydrocarbon softener | 10 | 10 |
| N-Cyclohexyl-2-benzothiazolesulfenamide | 1.2 | |
| 3,3'-[p-Phenylenebis (iminomethylene)]-bis (2-benzothiazolinethione) | | 2.2 |

The stocks were vulcanized by heating 45 minutes at 144° C. and physical properties tested with the results recorded below:

| Stock | Modulus 300% Elongation lbs./in.² | Elongation, Percent | Hysteresis | Heat Rise, ° C. |
| --- | --- | --- | --- | --- |
| G | 1,680 | 560 | .247 | 27 |
| H | 2,210 | 430 | .201 | 24 |

The promoters of this invention, while especially applicable to natural rubber and butadiene-styrene copolymer rubber and mixtures thereof, are useful in synthetic rubbery homopolymers of aliphatic conjugated diene hydrocarbons, as for example cis polybutadiene and cis polyisoprene, and in synthetic rubbery copolymers containing 50% or more of such diolefin hydrocarbons copolymerized with copolymerizable monoolefinic which includes, besides, styrene, acrylonitrile and monovinylpyridine. While no perceptible advantages were observed in butyl rubber, the compounds improved the hysteresis properties of chlorinated butyl rubber. Into a Banbury mixer at 100° C. was charged

| Stock | Parts by Weight | |
| --- | --- | --- |
| | J | K |
| Chlorinated butyl rubber (MD 551) | 100 | 100 |
| Carbon black | 50 | 50 |
| 3,3'-[p-Phenylenebis (iminomethylene)]-bis (2-benzothiazolinethione) | | 0.5 |
| Magnesium oxide | 2 | 2 |
| Stearic acid | 1 | 1 |
| Paraffinic hydrocarbon oil | 5 | 5 |
| After mixing there was added on a mill— | | |
| Zinc oxide | 3 | 3 |
| Base catalyzed p-alkylphenol-formaldehyde resin | 3 | 3 |
| 2,2-Dithiobis(benzothiazole) | 2 | 2 |
| Tetramethylthiuram disulfide | 1 | 1 |

The stocks were cured by heating 40 minutes at 307° F. Torsional hysteresis of control Stock J was 0.310 as compared to 0.240 for Stock K.

It is noteworthy that the aromatic diamine nucleus present in the new compounds is necessary for reducing internal friction. Comparable results were not observed with the reaction product of mercaptobenzothiazole, formaldehyde, and aniline described by Coleman, U.S. Patent 2,010,059, August 6, 1935, Example C, page 1. This product will be hereinafter designated by Code No. CP 26911. Scott (U.S. Patent 2,259,354, October 14, 1941) discovered that reactions of mercaptoarylthiazole, formaldehyde, and salts of primary aromatic amines as distinguished from the amines themselves yielded materials definitely distinguishable by analysis and physical characteristics from those described by Coleman, to which the latter assigned the general formula

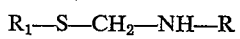

$R_1$—S—$CH_2$—NH—R where R is a substituted or unsubstituted aryl group and $R_1$ is a thiazyl group. Scott suggests that variations may be made in the ingredients employed and proposes certain aromatic diamines which in Coleman's process would presumably lead to products in which R was amino-substituted aryl. It seems desirable to ascertain whether carrying out under acid conditions the process by which 3,3′ - [p-phenylenebis(iminomethylene)methylene]bis(2-benzothiazolinethione) was prepared would yield a product which reduced internal friction, but the results were again negative. The procedure was as follows:

To a stirred suspension comprising 83.5 grams (0.5 mole) of 2-mercaptobenzothiazole and 200 ml. of ethyl alcohol was added at room temperature in one portion, 40.4 grams (0.520 mole) of 37% formaldehyde. After stirring for 5 minutes, 75 ml. of concentrated hydrochloric acid was added in one portion followed immediately by the addition in one portion of 27.5 grams (0.25 mole) of p-phenylenediamine. The temperature rose from 27° to 37° C. in five minutes. The reaction mixture was then heated at refluxing temperature for three hours and allowed to stand for 48 hours at room temperature. At the end of this time the reaction product was in the form of thick mush. This was stirred and added to one liter of ice-water. After stirring for 30 minutes the solid was filtered from solution and air-dried at room temperature. After recrystallization from dilute ethyl alcohol the brownish-yellow solid melted at 179°–180° C. with a yield of 70.7%. This product will be hereinafter designated by Code No. CP 26948. CP 26948 and CP 26911 were evaluated by the following procedure:

(1) Pre-masticated natural rubber, zinc oxide, and stearic acid were added to a Banbury mixer preheated to 150° C. and mixed for 1 minute at third speed.
(2) The chemical to be tested was mixed with the carbon black and one-half of this mixture and the aromatic oil were added to the Banbury and mixing continued for 1 minute at second speed.
(3) The remainder of the carbon-black mixture was then added and mixed for 4 minutes at second speed.
(4) The Banbury was dumped and the stock blended six times on an open mill.
(5) The remaining ingredients were added on a rubber mill at 70° C.

| Stock | Parts by Weight | | | |
|---|---|---|---|---|
| | L | M | N | O |
| Smoked sheets rubber | 100 | 100 | 100 | 100 |
| CP 26948 | | 0.5 | | |
| 3,3′-[p-Phenylenebis(iminomethylene)]bis(2-benzothiazolinethione) | | | 0.5 | |
| CP 26911 | | | | 0.5 |
| Carbon black (high abrasion furnace) | 50 | 50 | 50 | 50 |
| Zinc oxide | 3 | 3 | 3 | 3 |
| Stearic acid | 2 | 2 | 2 | 2 |
| Aromatic oil | 5 | 5 | 5 | 5 |
| N-tert.-Butyl-2-benzothiazolesulfenamide | 0.4 | 0.4 | 0.4 | 0.4 |
| Sulfur | 2 | 2 | 2 | 2 |

The stocks were vulcanized by heating in a press in the usual manner for 40 minutes at 144° C. Modulus, tensile properties, and torsional hysteresis are recorded below:

| Stock | Modulus of Elasticity in lbs./in.$^2$ at Elongation of 300% | Tensile at Break in lbs./in.$^2$ | Torsional Hysteresis |
|---|---|---|---|
| L | 2,150 | 4,300 | .187 |
| M | 2,180 | 4,600 | .182 |
| N | 2,170 | 4,600 | .135 |
| O | 2,100 | 4,400 | .165 |

These data show that CP 26948 and CP 26911 are essentially inactive for reducing internal friction. Experimental error in determining torsional hysteresis is on the order of ±.015–.020; and, although the torsional hysteresis of .165 in Stock O is slightly outside experimental error, it is of no practical significance.

It is intended to cover all changes and modifications of the examples of the invention herein chosen for purposes of disclosure which do not constitute departures from the spirit and scope of the invention.

What is claimed is:

1. A process which comprises mixing a rubber selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound, chlorinated butyl rubber, butyl rubber being a copolymer of a large proportion of an isomonoolefin and a small proportion of a diolefin, and mixtures of such rubbers, with a relatively large amount of rubber reinforcing pigment and a small amount effective to reduce internal friction of the vulcanizate of a compound having the formula

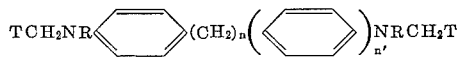

where $n$ and $n'$ are integers zero or one with the proviso that when $n'$ is zero $n$ is also zero, T is a radical selected from the group consisting of 2-thioxo-3-thiazolinyl, lower-alkyl-substituted 2-thioxo-3-thiazolinyl, lower-carboalkoxy-substituted 2-thioxo-3-thiazolinyl, 2-thioxo-3-benzoxazolinyl, 2-thioxo-3-benzothiazolinyl, and nitro-, chloro-, phenyl-, lower-alkoxy-, and lower-alkyl-substituted 2-thioxo-3-benzothiazolinyl, and R is selected from the group consisting of hydrogen and lower alkyl, incorporating vulcanizing ingredients and vulcanizing the composition.

2. The process of claim 1 in which the reinforcing pigment is carbon black.

3. A process which comprises mixing a rubber selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound, chlorinated butyl rubber, butyl rubber being a copolymer of a large proportion of an isomonoolefin and a small proportion of a diolefin, and mixtures of such rubbers, with a relatively large amount of rubber reinforcing carbon black and a small amount effective to reduce internal friction of the vulcanizate of a compound having the formula

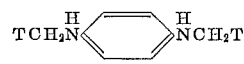

where T represents 2-thioxo-3-benzothiazolinyl, incorporating vulcanizing ingredients, and vulcanizing the composition.

4. A process which comprises mixing a rubber selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound, chlorinated butyl rubber, butyl rubber being a copolymer of a large proportion of an isomonoolefin and a small proportion of a diolefin, and mixtures of such rubbers, with a relatively large amount of rubber reinforcing carbon black and 0.25–1.0 part per hundred parts of said rubber of a compound having the formula

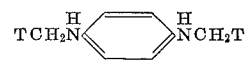

where T represents 2-thioxo-3-benzothiazolinyl, incorporating sulfur and delayed action thiazolesulfenamide accelerator, and vulcanizing the composition, thereby obtaining a vulcanizate of lower internal friction than would be gained from a similar composition in the absence of a compound having the formula described above.

5. The process of claim 4 in which the rubber is natural rubber.

6. The process of claim 4 in which the rubber is butadiene-styrene copolymer rubber.

7. The process of claim 4 in which the rubber is a mixture of natural rubber and butadiene-styrene copolymer rubber.

8. A process which comprises mixing a rubber selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound, chlorinated butyl rubber, butyl rubber being a copolymer of a large proportion of an isomonoolefin and a small proportion of a diolefin, and mixtures of such rubbers, with a relatively large amount of rubber reinforcing carbon black and a small amount effective to reduce internal friction of the vulcanizate of a compound having the formula

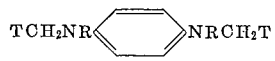

where T represents 2-thioxo-3-benzothiazolinyl and R represents lower alkyl, incorporating vulcanizing ingredients and vulcanizing the composition.

9. A process which comprises mixing a rubber selected from the group consisting of natural rubber, synthetic rubbery homopolymers of aliphatic conjugated diolefin hydrocarbons, synthetic rubbery copolymers containing at least 50% of an aliphatic conjugated diolefin hydrocarbon copolymerized with correspondingly not more than 50% of a copolymerizable monoethylenically unsaturated compound, chlorinated butyl rubber, butyl rubber being a copolymer of a large proportion of an isomonoolefin and a small proportion of a diolefin, and mixtures of such rubbers, with a relatively large amount of rubber reinforcing pigment and a small amount effective to reduce internal friction of the vulcanizate of a compound having the formula

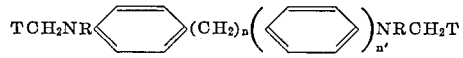

where $n$ and $n'$ are integers zero or one with the proviso that when $n'$ is zero $n$ is also zero, T is a radical selected from the group consisting of 2-thioxo-3-thiazolinyl, lower-alkyl-substituted 2-thioxo-3-thiazolinyl, lower-carboalkoxy-substituted 2-thioxo-3-thiazolinyl, 2-thioxo-3-benzoxazolinyl, 2-thioxo-3-benzothiazolinyl, and nitro-, chloro-, phenyl-, lower-alkoxy-, and lower-alkyl-substituted 2-thioxo-3-benzothiazolinyl, and R is selected from the group consisting of hydrogen and lower alkyl, incorporating vulcanizing ingredients, an accelerating amount of a thiazole-sulfenamide accelerator, and vulcanizing the composition, thereby obtaining a vulcanizate of lower internal friction than would be gained from a similar composition in the absence of a compound having the formula described above.

10. A process which comprises mixing chlorinated butyl rubber, butyl rubber being a copolymer of a large proportion of an isomonoolefin and a small proportion of a diolefin, with a relatively large amount of reinforcing carbon black and a small amount effective to reduce internal friction of the vulcanizate of a compound of the formula

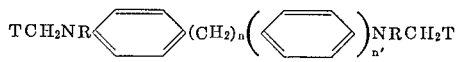

where $n$ and $n'$ are integers zero or one with the proviso that when $n'$ is zero $n$ is also zero, T is a radical selected from the group consisting of 2-thioxo-3-thiazolinyl, lower-alkyl-substituted 2-thioxo-3-thiazolinyl, lower-carboalkoxy-substituted 2-thioxo-3-thiazolinyl, 2-thioxo-3-benzoxazolinyl, 2-thioxo-3-benzothiazolinyl, and nitro-, chloro-, phenyl-, lower-alkoxy-, and lower-alkyl-substituted 2-thioxo-3-benzothiazolinyl, and R is selected from the group consisting of hydrogen and lower alkyl, incorporating vulcanizing ingredients, and vulcanizing the composition.

References Cited by the Examiner

UNITED STATES PATENTS

| | | | |
|---|---|---|---|
| 2,010,059 | 8/1935 | Coleman | 260—306.6 |
| 2,145,808 | 1/1939 | Sibley | 260—788 |
| 2,259,354 | 10/1941 | Scott | 260—306.6 |
| 2,356,163 | 8/1944 | Jones et al. | 260—788 |
| 2,476,669 | 7/1949 | Knott | 260—304 |
| 2,790,839 | 4/1957 | Doak | 260—763 |
| 2,891,924 | 6/1959 | Doak | 260—763 |
| 3,047,529 | 7/1962 | Leshin | 260—41.5 |
| 3,050,526 | 8/1962 | Lo | 260—304 |
| 3,085,990 | 4/1963 | Tung | 260—41.5 |

MURRAY TILLMAN, *Primary Examiner.*

G. F. LESMES, *Assistant Examiner.*